United States Patent [19]

Takarada

[11] 3,851,134

[45] Nov. 26, 1974

[54] ELECTRICAL DISCHARGE MACHINING POWER SWITCH SHORT CIRCUIT DETECTION

[76] Inventor: Eiichi Takarada, 1423 Vassar Rd., Rockford, Ill. 61103

[22] Filed: Nov. 5, 1973

[21] Appl. No.: 412,702

[52] U.S. Cl................ 219/69 S, 219/69 C, 315/186
[51] Int. Cl............................................. B23k 9/16
[58] Field of Search...... 219/69 C, 69 S; 307/235 R, 307/251; 315/186

[56] References Cited
UNITED STATES PATENTS 3,751,622  8/1973  Bell...................................... 219/69 S Primary Examiner—E. A. Goldberg
Assistant Examiner—Hugh D. Jaeger

[57] ABSTRACT

To detect short circuit failures of power switches in electrical discharge machining power supplies, the voltages developed across the power switches are sampled and, if any one of the sampled voltages is below a predetermined level, the delivery of power to the gap is interrupted.

5 Claims, 1 Drawing Figure

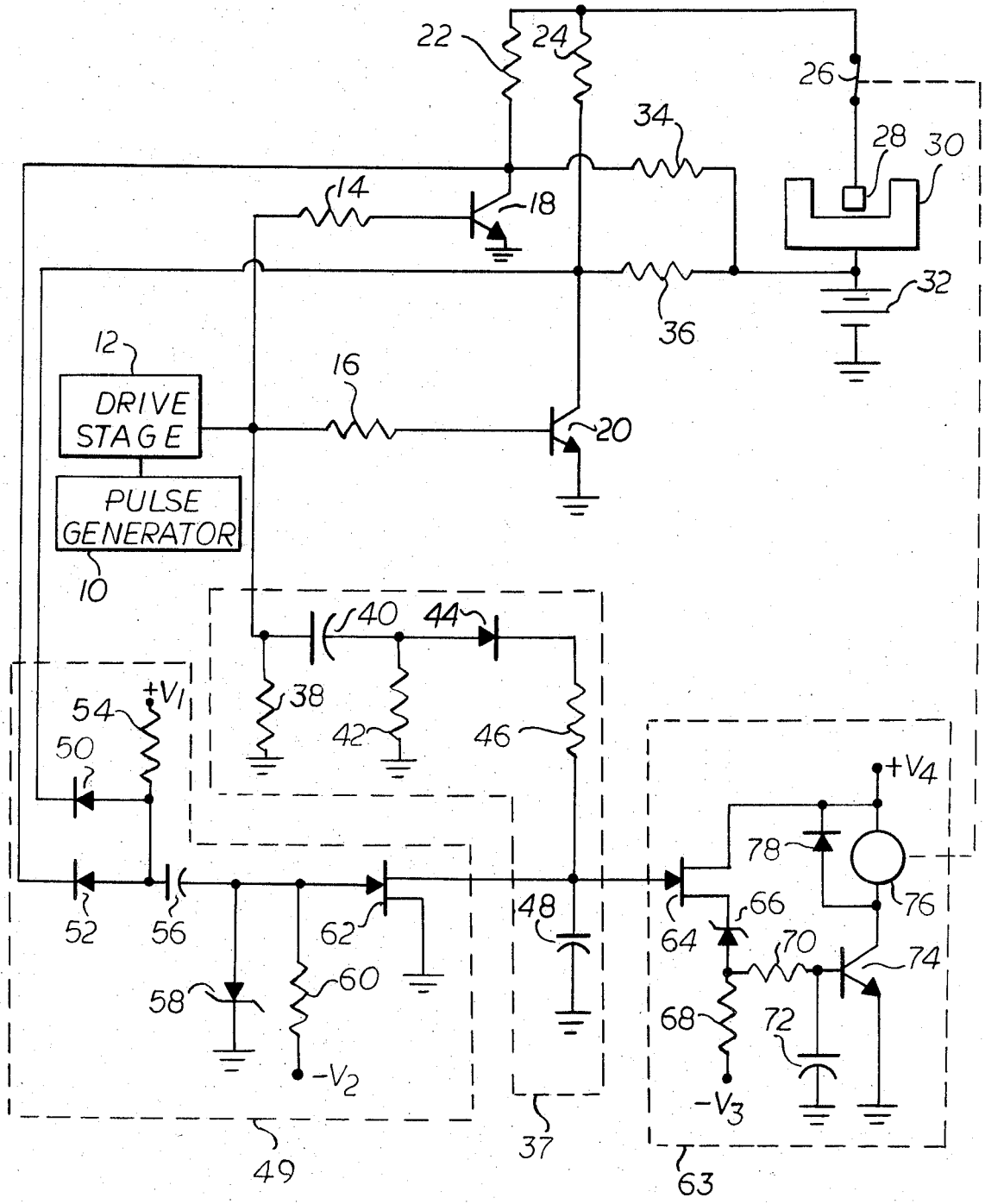

ELECTRICAL DISCHARGE MACHINING POWER SWITCH SHORT CIRCUIT DETECTION

The present invention relates generally to electrical discharge machining (EDM). More particularly it relates to sensing abnormal conditions at one or more power switches of an EDM power supply, and responding to such conditions so as to control arcing across the gap between associated electrodes and workpieces.

Electrical discharge machining is a process that utilizes electrical discharges, or sparks, to machine metal. The surface being machined is bombarded with high intensity electrical energy pulses that gradually erode away the stock until the desired configuration is obtained.

To accomplish the machining operation, a control mechanism is required to maintain the proper electrode-to-workpiece relationship. A power source is required to produce the electrical energy. And a dielectric oil is needed to immerse the cutting action.

The electrical energy discharges are the result of a direct current power pulse produced by the power source and impressed on an electrode held in the machine tool. As the electrode is moved toward the workpiece, the attraction between the negative polarity electrode and positive polarity workpiece increases until the electrical energy overcomes the barrier set up by the dielectric oil and is transferred to the workpiece in the form of a spark. This high energy spark, through vaporization, melting, and an explosive effect, dislodges a minute particle of metal from the workpiece, leaving a small crater. The dislodged particle, or chip, is then washed away by the dielectric oil.

Although the chip and the crater produced by one spark is extremely small, energy pulses can be created by the power source at frequencies which make the total amount of metal removed significant.

The high energy direct current pulses required at the gap are produced by a power supply. These pulses can be delivered directly to the cutting area, or can be fed into capacitors where they are stored before being delivered to the gap in a more intensified form.

Feeding of the electrode into the workpiece as the stock is removed is controlled by electrical feedback from the cutting gap. A reference voltage is established within the power supply, to which the voltage at the gap is compared. As stock is removed, the distance between the electrode and the workpiece is increased, which in turn increases the voltage across the gap. When the gap voltage differs from the reference voltage, a signal is sent to a servo valve and the servo valve actuates a hydraulic cylinder to move the electrode closer to the workpiece and bring the system back into balance.

A gap between the electrode and workpiece is necessary for efficient cutting. Ideally, the electrode never comes into contact with the workpiece. The gap is adjustable and will vary with cutting conditions.

To accurately control the electrical discharges and the resulting metal removal, not only is a gap required between the electrode and the workpiece, but it is also required that the cutting be done in a controlled and constant environment. A dielectric oil is used for this purpose to completely isolate the cutting area.

The dielectric isolating the cutting action from the air has three prime functions; cooling the workpiece, flushing residue from the cutting gap, and acting as a constant and controllable opposition to the electrical discharges.

To accurately control the operation, the dielectric must act as an insulator and then must break down when a specific voltage is reached. When this "breakdown" occurs, the dielectric becomes ionized and permits current to flow between the electrode and the workpiece.

There are various forms of power supplies for electrical discharge machining, including some designed for single-lead or single-electrode machining and other designed for multi-lead machining, some intended for pulse mode machining and others intended for capacitor discharge mode machining, and some wherein both the high voltage necessary to initially ionize the gap and the high current required to remove significant amounts of material from the workpiece are supplied by the same source and others wherein separate high voltage and high current supplies are employed.

Most, if not all, of the known electrical discharge machining power supplies are characterized by including a power switch for each electrode. Each such power switch is opened and closed, i.e., switched between nonconductive and conductive states, to introduce discontinuities in the supply of the machining energy so that a series of discrete discharges such as are required for proper machining are produced between each electrode and workpiece. The switching is generally affected on a periodic basis, so that the discrete discharges have a predetermined frequency and duty cycle. Further, due to the substantial current involved in electrical discharge machining, each power switch typically comprises a bank or plurality of parallel-connected switching devices, although on occasion a single switching device may be employed.

One of the more common malfunctions in electrical discharge machining power supplies is the failure of a power switch due to manufacturing defects, user abuse, or just ordinary wear and tear. In many power supplies, such as the modern transistorized ones, such a failure generally takes the form of a burned out or short circuit condition, which results in a continuous discharge being established between the electrode associated with the faulty power switch and the workpiece. Such a discharge is undesirable since it does not shift from point to point on the workpiece as required for proper machining, and is potentially damaging to the electrode and workpiece due to the extreme, localized heat that may be generated if it is allowed to persist. Thus, when a power switch short circuit failure occurs, it is important that the power supply be shut down before any irreparable damage is done. At the same time, however, it is desirable to avoid inadvertently shutting down the power supply, since any shutdown necessarily results in the loss of valuable machining time.

Since an operator cannot easily or reliably detect a short circuit failure, short circuit detectors for electrical discharge machining power supplies have heretofore been suggested. For example, Webb U.S. Pat. No. 3,257,580 and Schierholt U.S. Pat. No. 3,399,288 discloses detectors for shutting down the power supply if leakage current through the power switches reaches an abnormally high level. These detectors are generally satisfactory if the normal leakage current characteristics of the particular switching devices used in the power supply are known with a relatively high degree of certainty, but may on occasion be affected by variant gap conditions, such as the gap voltage polarity reversal sometimes encountered in capacitor discharge mode machining. Moreover, fault detectors which rely on the leakage current level for detection purposes are undesirably sensitive to the different nominal conditions that may be encountered, such as when one switching device within a power switch bank is replaced by a device that has a different nominal leakage current characteristic. Thus, to avoid the necessity of recalibrating such a detector, the nominal leakage current characteristics of any switching device to be used for replacement purposes has to be closely matched to the nominal characteristics of the original switching device. My U.S. Pat. No. 3,627,967 discloses an improvement over Webb and Schierholt and is incorporated herein by reference.

An object of the present invention is to provide a new and improved fault detector for sensing short circuit failures of power switches in electrical discharge machining power supplies. More specifically, an object is to provide a fault detector of the foregoing type which is substantially insensitive to variant gap conditions that may occur and which uses a parameter for short circuit detection which is substantially independent of the number of parallel-connected switching devices comprising the power switch.

Another object of this invention is to provide a fault detector for sensing power switch short circuit failures in electrical discharge machining power supplies. A related object is to provide a fault detector of the foregoing type which may be used to advantage in single-lead or multi-lead power supplies including power switches comprising either a single switching device or a bank or parallel-connected switching devices.

Still another object of this invention is to provide a fault detector of the foregoing type which does not require unusually careful selection of the power switch components, but which is nevertheless highly reliable in operation and suitable for use with a wide variety of existing and new electrical discharge machining power supplies.

Additional objects and advantages of this invention will be apparent to those skilled in the art upon consideration of the disclosure, including the drawing which illustrates a simplified electrical schematic diagram of the power supply for an electrical discharge machining apparatus of the present invention.

Turning now to the drawing, in the interest of brevity the power supply circuit has been simplified in the manner shown. An appropriate pulse generator 10 may include a multivibrator well known in the art, and is used to provide variable on-off timed pulses. The output of pulse generator 10 is fed to a drive stage 12, the output of which is fed through current limiting resistors 14 and 16 to trigger the power switches or output transistors 18 and 20. Resistors 22 and 24 tied to the collectors of power transistors 18 and 20, respectively, provide loading for these power transistors.

A relay switch 26 is connected in series with the collectors of power transistors 18 and 20 and a tool electrode 28. Electrode 28 is movably positioned above and spaced from a workpiece 30, forming a gap therebetween. A conventional direct current power source 32 provides the actual cuting current. Resistors 34 and 36 are connected between power source 32 and the collectors of power transistors 18 and 20, respectively, to provide the necessary closed circuits required for detection of transistor shorts.

A portion of the output signal from drive stage 12 is passed to a storage network 37, which includes ground return resistor 38 and the combination of a capacitor 40 and a resistor 42 which differentiates the applied pulses. It will be apparent that these differentiated pulses are not influenced by the width of the incoming pulses. The output of this RC combination is connected to the anode of a rectifier 44, the cathode of which is connected through a resistor 46 to a storage capacitor 48. Rectifier 44 prevents the formation of a discharge path for capacitor 48 through resistors 46 and 42. Capacitor 48 stores a voltage which is representative of the sum of the pulses arriving from drive stage 12.

A sensing network 49 includes a pair of rectifiers 50 and 52, the cathodes of which are connected to the collectors of power transistors 18 and 20, respectively. Rectifiers 50 and 52 provide isolation for the input of the sensing network. The anodes of rectifiers 50 and 52 are connected through a biasing resistor 54 to a positive voltage source $V_1$. These anodes are also connected through a coupling capacitor 56 to the gate of a field effect transistor 62, which is also connected through a biasing resistor 60 to a negative voltage source $V_2$. The gate of field effect transistor 62 is also returned to ground through a zener diode 58, thus establishing a constant voltage drop to clamp the gate of field effect transistor 62.

When field effect transistor 62 is turned on, it provides a discharge path for capacitor 48 and thereby continuously discharges the voltage stored in capacitor 48 as each pulse arrives from drive stage 12. In the event either power transistor 18 or 20 were to become shorted, which is the normal mode of failure, field effect transistor 62 would be prevented from turning on, thus allowing the voltage in capacitor 48 to rise as each pulse arrives from drive stage 12. This would continue until the voltage stored in capacitor 48 reaches a level sufficient to actuate a control network 63.

Control network 63 includes a field effect transistor 64 having its gate connected to capacitor 48. The voltage applied at the gate of field effect transistor 64 is approximately equal to that present at the cathode of a zener diode 66. When this voltage reaches the zener voltage of zener diode 66, a positive voltage is applied to the base of a transistor 74, rendering it conductive. A biasing resistor 68 is connected between the anode of zener diode 66 and a negative voltage source $V_3$. A current limiting resistor 70 is in series with the base of transistor 74.

In order that transistor 74 will not be rendered conductive inadvertently as a result of spurious noise in the circuit, a capacitor 72 is connected between the base of transistor 74 and ground, thereby providing necessary noise supression.

When transistor 74 becomes conductive, current flows through a relay coil 76. As a result relay switch 26 is actuated, thereby interrupting the machining process. A diode 78 is connected in parallel with relay coil 76 to prevent a high reverse voltage from damaging transistor 74. Such a voltage may be formed by the energy stored in the inductance of relay coil 76. The drain of field effect transistor 64, one side of relay coil 76 and the cathode of diode 78 are all connected to a positive voltage source $V_4$.

It should be understood that a single electrode 28 is illustrated herein for the purpose of simplicity. Where a single-lead electrical discharge machining apparatus is contemplated, a single electrode associated with a single power transistor is adequate. However, for a multi-lead apparatus, a plurality of electrodes are provided, one of which is associated with each power switch.

Similarly, two power switches 18 and 20 are illustrated. However, it should be understood that a single power switch could be provided for a single-lead apparatus. Any desired number of power switches could be provided, each with its associated electrode, for a multi-lead apparatus.

The power switches are illustrated as being output transistors 18 and 20 but a bank of transistors may be connected in parallel to provide the necessary circuit requirements.

Although this invention is described with reference to a single illustrated embodiment, it is understood that the intent is not to limit it to that embodiment but rather to cover all modifications, alternatives and equivalents within the spirit and scope of the invention as defined by the claims.

I claim:

1. In an electrical discharge machining assembly including pulse-generating means for supplying pulses of a predetermined frequency and duty cycle, at least one electrode and conductive workpiece defining therebetween an ionizable gap, and a circuit including at least one power switch means coupling said pulse-generating means with said electrode and workpiece whereby pulses are passes through said gap to machine said workpiece; the improvement comprising a storage network coupled with said circuit for storing energy representative of said pulses, a sensing network coupled with the output of said power switch means for sensing a short circuit condition at said power switch means and coupled with said storage network for discharging said energy in the absence of said short circuit condition, and a control network coupled with said storage network for actuation thereby when said energy is not discharged, said control network coupled with said circuit for interrupting the machining of said workpiece when actuated by said storage network.

2. The invention according to claim 1, said storage network including a capacitor for storage of said energy representative of the sum of said pulses.

3. The invention according to claim 2, said sensing network including a transistor coupling said capacitor with ground and rendered conductive in the absence of said short circuit condition for discharging said capacitor, said transistor being rendered non-conductive in the presence of said short circuit condition for interrupting discharge of said capacitor.

4. The invention according to claim 3, said control network including a transistor rendered conductive by the presence in said capacitor of said energy above a predetermined level, and switch means energized when said transistor is conductive for interrupting the machining of said workpiece.

5. The invention according to claim 4, said storage network including means for differentiating said pulses prior to said storage by said capacitor.

* * * * *